United States Patent [19]

Gross

[11] Patent Number: 4,741,870
[45] Date of Patent: May 3, 1988

[54] APPARATUS FOR TREATMENT OF LIQUIDS

[75] Inventor: Peter S. Gross, Plymouth, Minn.

[73] Assignee: Aeromix Systems, Incorporated, Plymouth, Minn.

[21] Appl. No.: 66,601

[22] Filed: Jun. 26, 1987

[51] Int. Cl.⁴ .............................................. B01F 3/04
[52] U.S. Cl. ...................................................... 261/93
[58] Field of Search ......................................... 261/93

[56] References Cited

U.S. PATENT DOCUMENTS

| | | | |
|---|---|---|---|
| 2,491,656 | 12/1949 | Goldman | 261/93 |
| 2,772,863 | 12/1956 | Harney et al. | 261/93 |
| 3,393,802 | 7/1968 | Logue et al. | 261/93 |
| 3,614,072 | 10/1971 | Brodie | 361/36 |
| 3,778,233 | 12/1973 | Blough et al. | 23/259 |
| 3,782,702 | 1/1974 | King | 261/87 |
| 3,846,292 | 11/1974 | Lecompte, Jr. | 210/14 |
| 3,975,469 | 8/1976 | Fuchs | 261/87 |
| 4,045,522 | 8/1977 | Nafziger | 261/93 |
| 4,240,990 | 12/1980 | Inhofer et al. | 261/87 |
| 4,280,911 | 7/1981 | Durda et al. | 210/629 |
| 4,308,221 | 12/1981 | Durda | 261/87 |
| 4,437,765 | 3/1984 | Seeger | 261/93 |

OTHER PUBLICATIONS

Brochure: "Aire-Oz Aeration Systems", Aeration Industries, Inc., Chaska, Minn., 1983.
"Lagoon Aerator Keeps Solids Suspended Under Heavy Ice Cover", J. Quigley, *Water & Sewage Works*, 7/76, pp. 64–68.
Brochure: F. G. W. Fusch Gas-u.Wassertechnik G.m.b.H. & Co. K.G.
Brochure: "OXYGUN Aeration Systems," Oxygun Aeration Company, Branford, Conn.

*Primary Examiner*—Tim Miles
*Attorney, Agent, or Firm*—Kinney & Lange

[57] ABSTRACT

Apparatus for the treatment of liquids, including waste liquids, by aeration. The apparatus has a propeller, a motor and a leg extending between the motor and propeller. The leg includes a shaft coupled to the motor, the shaft driving the propeller. An outer housing of the leg generally surrounds the shaft. Air is drawn into and through the leg on rotation of the propeller within the liquid and is discharged into the liquid generally adjacent the propeller. In the improvement of the present invention, the shaft is solid while a tubular cantilever is supported at one of its ends within the outer leg housing in surrouding relation to the shaft. The tubular cantilever extends from its supported end away from the motor. Bearings support the shaft via the tubular cantilever at spaced locations along the shaft and cantilever.

10 Claims, 1 Drawing Sheet

APPARATUS FOR TREATMENT OF LIQUIDS

BACKGROUND OF THE INVENTION

1. Field of the Invention.

The present invention relates to the treatment of liquids, including waste liquids and, particularly, to apparatus of the type having a propeller which draws air or other gas into an elongated leg for discharge into the liquid on rotation of the propeller within the liquid.

2. Description of the Prior Art.

Aeration devices for the treatment of liquid, and particularly water, are known to the prior art. Such treatment may be employed to encourage aerobic bacteria in the treatment of waste water or in the treatment of water bodies generally to make it more potable or suitable for food production. Ice control is also another application for which it may be desirable to "treat" water by aeration.

Known liquid aeration treatment systems include those generically classified in four categories: diffused air; surface aerator; jet aerator; and rotors. Each of these systems has applications in which they have particular advantages. Each also has applications in which they are not particularly suitable.

A further type of aerator, of which the present invention is an improvement, is known to the prior art. This type of aerator employs a propeller and motor with a leg extending between the motor and propeller. The leg includes a shaft coupled to the motor which drives the propeller. An outer housing often surrounds the shaft.

Units of the type described in the paragraph immediately above are supported, in any desired manner, with the motor out of the liquid being treated and the leg extending below the liquid surface. An air intake allows rotation of the propeller to draw air into the leg to be discharged generally at or through the propeller. In all systems of this type known to the inventor, the outer housing (when it exists) is used to provide support for the shaft with the shaft being hollow to provide a flow of air from the inlet to the point of discharge. While these types of systems have proven effective, the length of the shaft provides a difficult alignment problem necessitating the use of the outer housing (or other similar structure) to support the shaft and minimize its deflection. The use of a hollow driving shaft to provide an air passageway between surface and point of discharge compounds this deflection problem while limiting the airflow capacity of the device.

SUMMARY OF THE INVENTION

The present invention provides apparatus of the type generally described above including a motor adapted to be supported out of the liquid being treated, a leg extending from the motor and a propeller at or adjacent the end of the leg. The leg includes a shaft coupled to the motor for driving the propeller and an outer housing generally surrounding the shaft. An air inlet is provided above the water or liquid line through which air is drawn into the leg on rotation of the propeller within the liquid, in known manner.

In the improvement of the present invention, the shaft by which the propeller is driven may be solid throughout its length between the motor (or the coupling by which it is connected to the motor) and the propeller. The outer housing defines the air passage between the air inlet an the point of air discharge.

The shaft is supported within the outer housing within a tubular cantilever that is, itself, supported generally at one end within the outer housing and extends from that end away from the motor. Bearings extending between the shaft and tubular cantilever allow rotation of the shaft while providing support against deflection. Preferably, at least two bearings are employed in spaced relation from each other along the shaft and tubular cantilever. Seals may be provided to protect the bearings from the liquid in which the propeller is immersed, while a fan may be provided on the shaft, outside of the tubular cantilever, to rotate with the shaft and facilitate movement of air through the leg. In a preferred embodiment, air may be directed over the motor to provide cooling while a further embodiment may employ a bushing extending between the outer housing and the shaft at a location generally adjacent the propeller to protect against shaft deflection while providing an air passage through the bushing or its support. The outer housing alignment may also be facilitated by supports extending from the cantilever, the supports allowing an airflow therethrough.

DETAILED DESCRIPTION OF THE PREFERRED EMBODIMENTS

Figure 1:
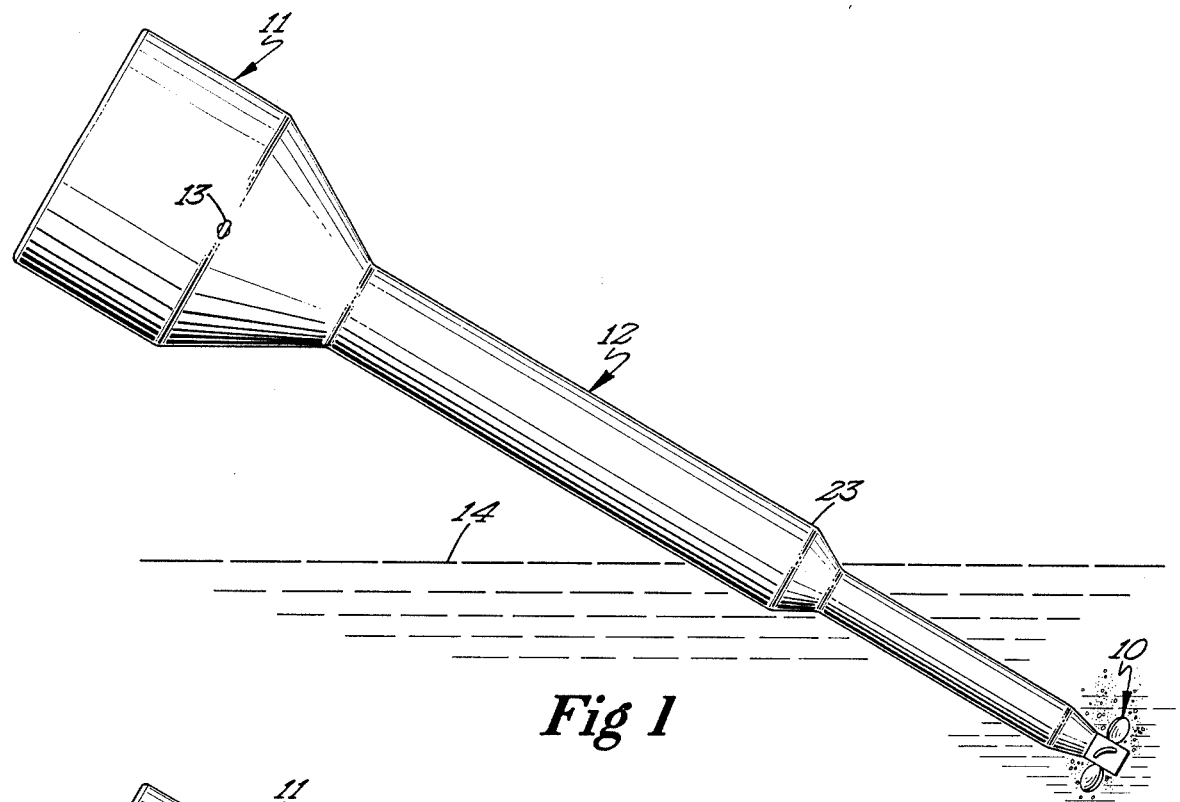
FIG. 1 illustrates the external configuration of one preferred embodiment of the present invention as well as a means of supporting the illustrated embodiment.

Referring now to FIG. 1, there is shown an external view of a preferred embodiment of the present invention including a propeller designated generally at 10 and a motor housing or cowl indicated generally at 11. A leg portion, designated generally at 12 extends between propeller 10 and motor 11. Mounting lugs 13 (one shown in FIG. 1) extend from opposing sides of the motor cowl 11 and provide a means by which the unit shown in FIG. 1 may be secured to a platform, buoy, or other supporting structure. In most applications, the unit of FIG. 1 will be supported at an angle between the horizontal and vertical (typically at approximately 30° from horizontal). This is represented by the dashed line 14 in FIG. 1 which represents the surface of the liquid it is intended to treat with the unit of the present invention. As can be seen, the motor (within the cowl 11) is supported above the liquid surface while the propeller 10 carried at the end of the leg 12 extends below the liquid surface level 14.

Figure 2:
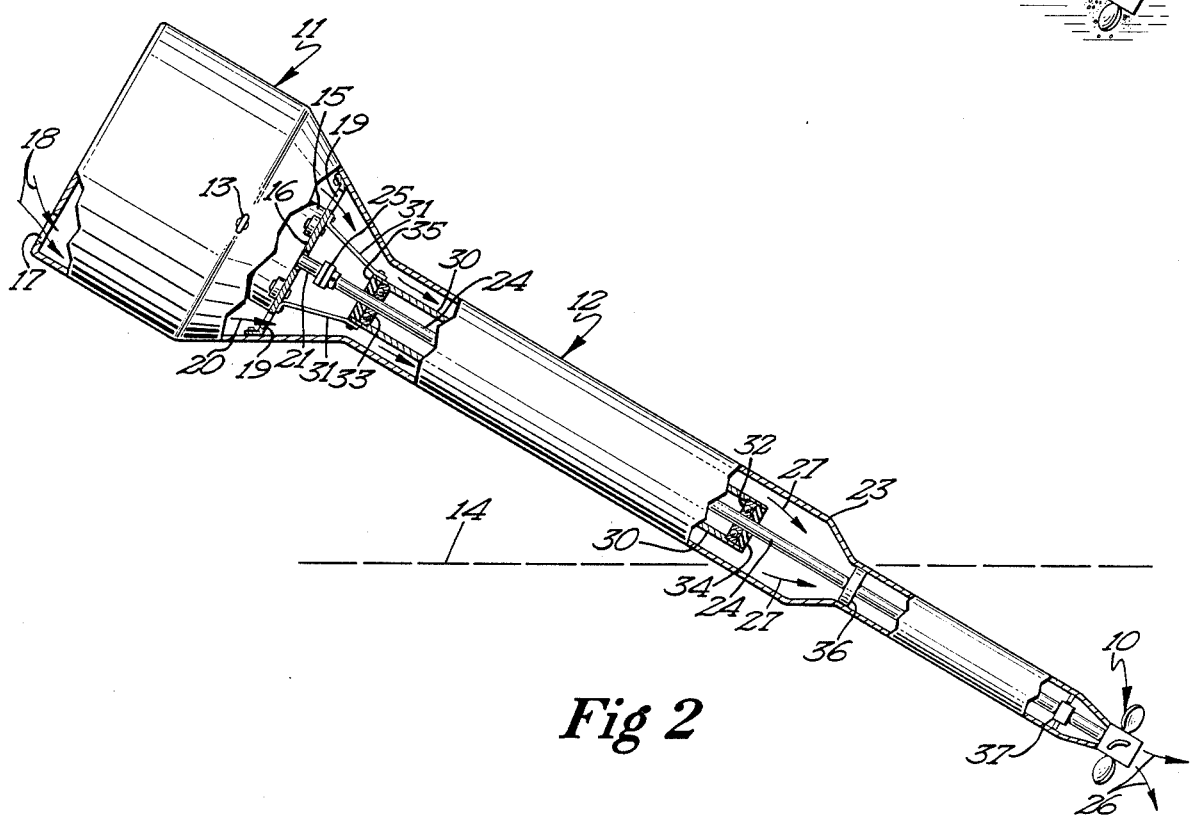
FIG. 2 illustrates a partial cut-away of the embodiment of FIG. 1 as well as additional features which may be incorporated into the basic preferred embodiment.

Referring now to FIG. 2, there is shown an embodiment generally corresponding to that of FIG. 1 wherein like reference numerals designate like elements. As shown, the cowl 11 surrounds a motor 15, the motor being secured to a mounting plate 16 in any known manner. An air intake 17 is provided in the cowl 11 through which air enters (represented by the arrow 18) to pass over the motor 15 and provide a cooling effect thereto. An air passage is provided within the cowl between the intake 17 and an inlet 19 to the leg portion 12 allowing air to enter the leg portion 12--as represented by the arrow 20. A shaft 21 of the motor 15 extends through the motor mounting plate 16. In some applications, it may be desirable to introduce a gas other than air. It is intended that the term "aeration," as employed in this specification and claims, embraces such other gas introduction.

As can be seen in FIG. 2, the leg 12 is formed of an outer housing 23 through which a shaft 24 extends. The shaft 24 extends between a coupler 25 and a propeller 10, the coupler 25 coupling the shaft 24 to the motor shaft 21. Connection between the shaft 21 and the propeller 10 may be in any desired manner. In a preferred embodiment, the propeller 10 has a center discharge represented by the arrows 26, the discharge path through the propeller 10 being connected to the air passage through the leg 12 defined by the outer housing 23. The propeller 10 may be of any type known to the art, as is its connection to the shaft 24 and communication with the air passage formed by the outer housing 23.

As described above, prior art units of the general description of the present invention employ a hollow shaft which provides an air passageway between an air inlet and a below surface outlet with an outer housing often being employed to support the propeller driving shaft along its length. In the present invention, the shaft 24 illustrated in FIG. 2 is solid throughout its length to provide increased strength and resistence to deflection. In the context of the present invention, minimization of shaft deflection is of great significance. The potential for increased airflow (gas flow) through the larger passage of the outer housing 23 is also of great significance. Utilization of a solid shaft, such as 24, enhances the ability of the present invention to accomplish these objectives. However, the utilization of the outer housing 23 to define the air passage between the air inlet 19 and discharge of the propeller 10 (as illustrated by the arrows 27) impacts on the availability of the outer housing 23 for support of the shaft 24 without serious blockage of airflow through the passage defined by the outer housing 23.

In accordance with the present invention, support of the shaft 24 is provided by a tubular cantilever 30. In the illustrated embodiment, the tubular cantilever 30 is secured to the motor mounting plate 16 by an adapter 31. The adapter 31 may be integral with the mounting plate 16 or secured thereto in any desired manner, as by welding. Similarly, the cantilever 30 may be fixed within the adapter 31 in any desired manner, again, as by welding. In any event, the tubular cantilever 30 is rigidly fixed to the mouting plate 16 to extend from the mounting plate 16 (and the end of the tubular cantilever that is secured to the adapter 31) along and around the solid shaft 24 for a significant portion of its length.

In the illustrated embodiments, the shaft 24 is supported by the cantilever 30 by forward bearings 32 and rearward bearings 33. These bearings 32 and 33 may be tapered roller bearings to provide not only support of the shaft 24 against deflection but also against longitudinal movement under the influence of forces transmitted to the shaft 24. The outer housing 24 may also be supported against deflection by the cantilever 30 as by braces 38 extending between the cantilever 30 and outer housing 23, which braces permit the airflow through the outer housing 23.

By comparison with FIG. 1, it can be seen that the surface of the liquid being treated (represented by the dotted line 14) defines a location through the leg 12. By maintaining the bearing 32 out of the liquid being treated, it is believed that its life will be extended. This can be facilitated through the use of a seal, represented at arrow 34, to prevent or block any liquid from bearing 32 (as may occur when the propeller 10 is submerged and the unit is not operational, as well as at other times). A similar seal 35 may be provided in conjunction with the bearing 33 for similar reasons.

Obviously, many modifications and variations of the present invention are possible in light of the above teachings. For example, the leg portion 12 is shown with an enlarged portion generally coextensive with the tubular cantilever 30 and with a reduced size or adapter portion to better facilitate the size of the propeller 10. The enlarged portion of leg 12 is intended to provide an adequate flow passage for air between the inlet 19 and the discharge of the propeller 10. In some instances, it may not be necessary to provide the reduction in the illustrated embodiment. Airflow through the passage defined by the outer housing 23 may be facilitated through the use of a fan 36 which may be of any convenient design. The fan may be secured to and rotatable with the shaft 24 in any desired manner. Also, in some instances, the propeller 10 may be expected to engage debris within the liquid being treated or surfaces containing the liquid under treatment. In such instances, it may be desirable to provide a further protection against deflection of the shaft 24. Such a protection is illustrated in FIG. 2 adjacent the propeller 10 in the form of a bushing 37 (within which the shaft 24 rotates) which may be secured to the outer housing 23 in any desired manner while allowing an airflow therethrough--as by employing a spider-like support of several webs extending between the bushing 37 and the housing 23, for example.

In addition, in some applications it may not be necessary to employ a cowl 11 of the type shown in the illustrated embodiment. In those instances, the cowl may be eliminated. Further, the tubular cantilever need not be secured to the motor support plate 16 by an adapter. Alternatively, the tubular cantilever 30 may be butted against the plate 16 and secured thereto by welding with the leg being similarly secured to that same plate. In this instance, the air intake into the passage defined by the outer housing 23 of the leg 12 may be positioned within a side wall of the outer housing 23, without departing from the scope of the present invention. It is therefore to be understood that, within the scope of the apended claims, the invention may be practiced otherwise than is specifically described.

What is claimed is:

1. In apparatus for the treatment of liquids, including waste liquids, by aeration, of the type having propeller means, motor means and leg means, said leg means extending between the motor means and propeller means and including shaft means coupled to said motor means for driving said propeller means and an outer housing generally surrounding said shaft means, and also having air inlet means through which air is drawn into said leg means on rotation of said propeller means within said liquid, said drawn air being discharged generally adjacent said propeller means, the improvement wherein said shaft means comprises a solid shaft and further comprising:

tubular cantilever means supported generally at one end within said outer housing in surrounding relation to said shaft means and extending from said one end away from said motor means; and bearing means supporting said shaft means within said tubular cantilever means at spaced locations along said shaft means and tubular cantilever means.

2. The apparatus of claim 1 wherein said bearing means comprises two bearings.

3. The apparatus of claim 2 further comprising sealing means within said tubular cantilever means for protecting said bearings from said liquid.

4. The apparatus of claim 1 further comprising sealing means within said tubular cantilever means for protecting said bearing means from said liquid.

5. The apparatus of claim 1 further comprising fan means carried by said shaft means outside of said tubular cantilever means and rotatable with said shaft means for facilitating the movement of air through said leg means.

6. The apparatus of claim 2 further comprising fan means carried by said shaft means outside of said tubular cantilever means and rotatable with said shaft means for facilitating the movement of air through said leg means.

7. The apparatus of claim 3 further comprising fan means carried by said shaft means outside of said tubular cantilever means and rotatable with said shaft means for facilitating the movement of air through said leg means.

8. The apparatus of claim 7 further comprising cowl means surrounding said motor means and comprising air intake means and air passage means for directing air over said motor means and from said cowl means air intake means to said air inlet means.

9. The apparatus of claim 8 further comprising bushing means extending from said outer housing to said shaft means generally adjacent said propeller means for protecting against shaft means deflection, said bushing means providing an air passage therethrough.

10. The apparatus of claim 1 further comprising brace means extending between said tubular cantilever means and said outer housing.

* * * * *